United States Patent
Sugita et al.

(10) Patent No.: US 6,704,478 B2
(45) Date of Patent: Mar. 9, 2004

(54) WAVELENGTH SEPARATION OPTICAL DEVICE AND MULTIPLE WAVELENGTH LIGHT TRANSMISSION MODULE

(75) Inventors: Tatsuya Sugita, Takahagi (JP); Koki Hirano, Hitachinaka (JP); Tomiya Abe, Juo (JP); Yuzo Ito, Mito (JP)

(73) Assignee: Hitachi Cable, Ltd., Tokyo (JP)

( * ) Notice: Subject to any disclaimer, the term of this patent is extended or adjusted under 35 U.S.C. 154(b) by 13 days.

(21) Appl. No.: 10/080,386

(22) Filed: Feb. 25, 2002

(65) Prior Publication Data

US 2003/0039434 A1 Feb. 27, 2003

(30) Foreign Application Priority Data

Aug. 23, 2001 (JP) .......................... 2001-253160

(51) Int. Cl.[7] .............................. G02B 6/27; G02B 6/28; G02B 6/34
(52) U.S. Cl. ............................. 385/24; 385/11; 385/15; 385/27; 385/31; 385/36; 385/39; 398/113
(58) Field of Search ................. 385/11, 15, 24, 385/27, 28, 31, 33–36, 39; 396/105, 108, 113, 115, 122

(56) References Cited

U.S. PATENT DOCUMENTS

| | | | | |
|---|---|---|---|---|
| 4,531,197 A | * | 7/1985 | Lin | .............................. 708/821 |
| 5,491,552 A | * | 2/1996 | Knuttel | ....................... 356/495 |
| 5,596,406 A | * | 1/1997 | Rosencwaig et al. | ........ 356/327 |
| 5,880,838 A | * | 3/1999 | Marx et al. | .................. 356/498 |
| 6,198,864 B1 | | 3/2001 | Lemoff et al. | |
| 6,201,908 B1 | | 3/2001 | Grann | |
| 6,538,817 B1 | * | 3/2003 | Farmer et al. | ............... 359/618 |
| 6,618,516 B1 | * | 9/2003 | Huang | .......................... 385/16 |
| 2002/0061166 A1 | * | 5/2002 | Gustafson et al. | ............. 385/33 |
| 2002/0154855 A1 | * | 10/2002 | Rose et al. | ..................... 385/24 |
| 2002/0171825 A1 | * | 11/2002 | Krantz et al. | ............. 356/237.1 |
| 2003/0095733 A1 | * | 5/2003 | Lin | ............................... 385/11 |
| 2003/0103718 A1 | * | 6/2003 | Chen | ............................ 385/22 |

FOREIGN PATENT DOCUMENTS

JP 2000-162466 6/2000

OTHER PUBLICATIONS

B. E. Lemoff, et al.—"Zigzag waveguide demultiplexer for multimode WDM LAN," Electronics Letters, May 14, 1998, vol. 34, No. 10, pp. 1014–1017.

* cited by examiner

Primary Examiner—John D. Lee
Assistant Examiner—Daniel Valencia
(74) Attorney, Agent, or Firm—Dickstein Shapiro Morin & Oshinsky LLP

(57) ABSTRACT

Linear polarized light beams are separated by wavelength separation filters 28a, 28b, and 28c, and make incidence with every two wavelength components either into a polarized light conversion element 20b or into polarized light conversion element 20c, and the optical paths for the light beams separated into two by the polarized light conversion element 20a are joined to form one light beam path for every waveform component. The optical signals of the four wavelength components are reflected either by a mirror 31b or by a mirror 31c, are converged by such as a hologram lens 40c, and, after being reflected by a mirror 32, are detected for every wavelength component by the photo detector array 36.

4 Claims, 5 Drawing Sheets

WAVE LENGTH (μm)

WAVELENGTH SEPARATION OPTICAL DEVICE AND MULTIPLE WAVELENGTH LIGHT TRANSMISSION MODULE

BACKGROUND OF THE INVENTION

1. Field of the Invention

The present invention relates to an optical device which separates optical signals with multiple wavelengths transmitted by means of an optical fiber into signals of every wavelength, and in particular, relates to a wavelength separation optical device, also known as an optical wavelength demultiplexer, which separates optical signals for every wavelength by making use of an optical filter and a multiple wavelength light transmission module using the wavelength separation optical device.

2. Conventional Art

JP-A-2000-162466, which corresponds to U.S. Pat. No. 6,198,864B1, discloses an optical demultiplexer in which a plurality of wavelength specifying filters each of which only permits transmission of a specified wavelength component and reflects other wavelength components are arranged, light beams reflected from the respective filters are propagated in a relaying manner by making use of such as an objective mirror and a relay focusing mirror and respective components passed through the filters are detected by photo detectors prepared for every wavelength component as a single component.

However, in the conventional optical demultiplexer, since the optical signals are propagated in a relaying manner by causing reflection on a curved surface of such as the objective mirror and the relay focusing mirror, there arose a problem that such as incident position error and incident angle error of optical signals due to slight displacement of an input use optical fiber are accumulated and enlarged when the same are reflected such as by the objective mirror and the relay focusing mirror, and a positional error of the finally detected optical signals is amplified. For this reason, an attachment position adjustment of the optical fibers was difficult.

Further, it was required to form in an optical block optical parts having a curved surface such as the objective mirror, the relay focusing mirror and a mirror lens array and in order to correctly relay and focus the optical signals the configuration of these optical parts has to be formed accurately, however, since these optical parts are microscopically small, there also arose a problem that an accurate formation thereof is difficult. Still further, it is required to apply a reflection coating on these optical parts, however, such coating has to be applied on a spherical surface, therefore, it was difficult to obtain a high reflectance, even if a dielectric multi layer film is used, thereby, an optical loss is likely to be caused.

SUMMARY OF THE INVENTION

The present invention is for resolving the above problems, and an object of the present invention is to provide a wavelength separation optical device of which assembly and adjustment is easy and which shows a small optical loss and further, to provide a multi wavelength light transmission module.

In order to achieve the above object, the present invention provides a wavelength optical separation device including a wavelength separation means which separates optical signals having multiple wavelengths carried through a photo transfer medium for every wavelength and a plurality of photo detectors which receive the optical signals separated by the wavelength separation means, which is characterized by further including a spreading angle reducing means which reduces a spreading angle of the optical signals making incidence from the photo transfer medium and a front polarized light conversion means which converts the optical signals transmitted from the spreading angle reducing means to the wavelength separation means into linear polarized light.

In the wavelength separation optical device of the present invention, by making incidence of the optical signals of linear polarized light aligned substantially in parallel light with the light beam spreading angle reducing means and the polarized light conversion means, the respective wavelength components can be separated and be taken out even when passage of the optical signals is bent by 90° by the wavelength separation means. Usually, when a branching angle is large, a difference in characteristic of the wavelength separation means is caused depending on polarized light making incidence thereinto. The difference due to the polarized lights is remarkable at a branching angle of more than 40° (an incidence angle of more than 20°) and, in particular, at a branching angle of more than 60° (an incidence angle of more than 30°). Since, after converting the optical signals into linear polarized light by the polarized light conversion means, the optical signals are made incidence into the wavelength separation filters, a large branching angle can be realized. The polarized light conversion means can be constituted, for example, by a PBS (Polarized Beam Splitter), a $\lambda/2$ plate and a mirror.

For a telecommunication use optical fiber, such as a single mode optical fiber and a multi mode optical fiber have been used. As the multi mode optical fiber, a multi mode optical fiber (50MMF) having core diameter of 50 $\mu$m and a multi mode optical fiber (62.5MMF) having core diameter of 62.5 $\mu$m are usually used. When these multi mode optical fibers are used, because of the large core diameter a plurality of modes are propagated, therefore, the light beams can not be aligned in complete parallel light beams, even if lenses are used, thereby, a spreading angle is caused. When optical signals having a spreading angle make incidence into the wavelength separation filters, the wavelength separation characteristic varies for every incidence angle. Namely, when an incident angle of a light beam onto a wavelength separation filter increases, the wavelength characteristic thereof shifts toward lower wavelength. For this reason, a spreading angle of incidence light beam is limited depending on the branching angle thereof to suppress the characteristic variation. As the light beam spreading angle reducing means, such as a lens, a refractive index distributing lens and an optical waveguide of which diameter increases in light emitting direction can be used.

Further, the present invention provides a multi wavelength light transmission module including a coupling portion with an optical signal transmission use optical fiber, a wavelength separation optical device, a photo detector array, a signal receiving circuit which amplifies signals from the photo detector array and waveshapes the same, a light source array, a signal transmission circuit which drives the light source array and a wavelength joining device which joins optical signals from the light source array, which is characterized, in that the coupling portion and the wavelength separation optical device are connected by a multi mode optical fiber, the wavelength separation optical device includes a spreading angle reducing means which reduces the spreading angle of the incident optical signals from the multi mode optical fiber and a front polarized light conversion means which converts the incident optical signals from the incident portion into linear polarized light, and the optical signals converted into linear polarized light by the polarized light conversion means are made incidence into the wavelength separation means to separate the same for every wavelength.

Since the wavelength separation optical device of the present invention is provided with the light beam spreading angle reducing means and the polarized light conversion means, the device can perform the wavelength separation even with the multi mode optical fiber. Accordingly, even when either a single mode optical fiber or a multi mode optical fiber is used for the signal transmission use optical fiber, the optical signals transmitted in multiple wavelengths can be separated and detected.

DETAILED DESCRIPTION OF THE EMBODIMENTS

At first, a first embodiment of the present invention will be explained with reference to FIGS. 1 through 5.

Figure 1:
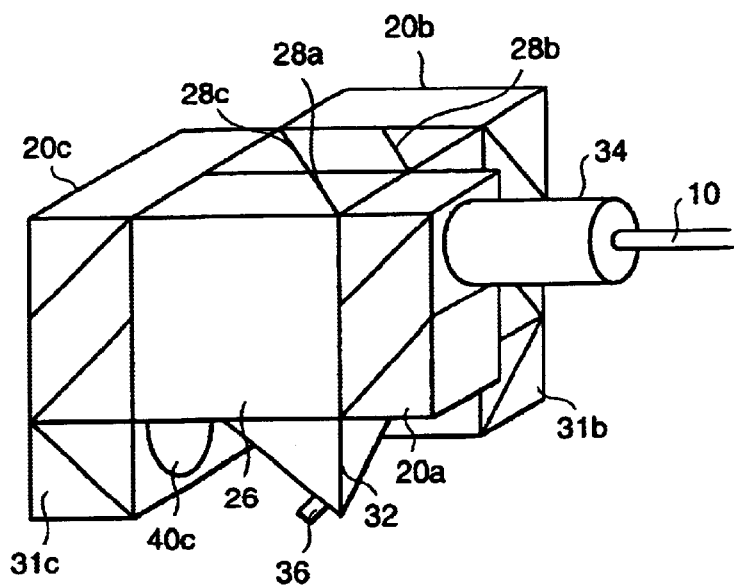
FIG. 1 relates to a first embodiment of the present invention and is a perspective view of a wavelength separation optical device.

FIG. 1 is a perspective view of a wavelength separation optical device according to the present embodiment.

Optical signals of which wavelength is multipled and which are transferred via an optical fiber (a photo transfer medium) 10 make incidence to a refractive index distributing lens 34 and are converted into substantially parallel light beams. The refractive index distributing lens 34 reduces the spreading angle of the optical signals and converts the same into substantially parallel light beams, therefore, functions as a spreading angle reducing means for the optical signals.

The optical signals converted into substantially parallel light beams by the refractive index distributing lens (the spreading angle reducing means of the optical signals) 34 make incidence into a polarized light conversion element 20a and are separated therein into two light beams and are emitted in a form of two linear polarized light beams of which polarization direction are aligned. The linear polarized light beams from the polarized light conversion element (a front polarized light conversion means) 20a are inputted into a wavelength separation prism (wavelength separation means) 26 including three wavelength separation filters 28a, 28b and 28c, and are separated thereby. In the present embodiment, the optical signals are separated into four wavelength components.

The optical signals separated by the wavelength separation prism 26 are inputted with every two wavelength components either into a polarized light conversion element (a rear polarized light conversion means) 20b or into a polarized light conversion element (a rear polarized light conversion means) 20c, and the optical paths for the light beams separated into two by the polarized light conversion element 20a are joined to form one light beam path for every waveform component. The optical signals of the four wavelength components are reflected either by a mirror 31b or by a mirror 31c, are converged by such as a hologram lens 40c, and, after being reflected by a mirror 32, are detected for every wavelength component by the photo detector array (which is constituted by four photo detectors) 36.

Figure 2:
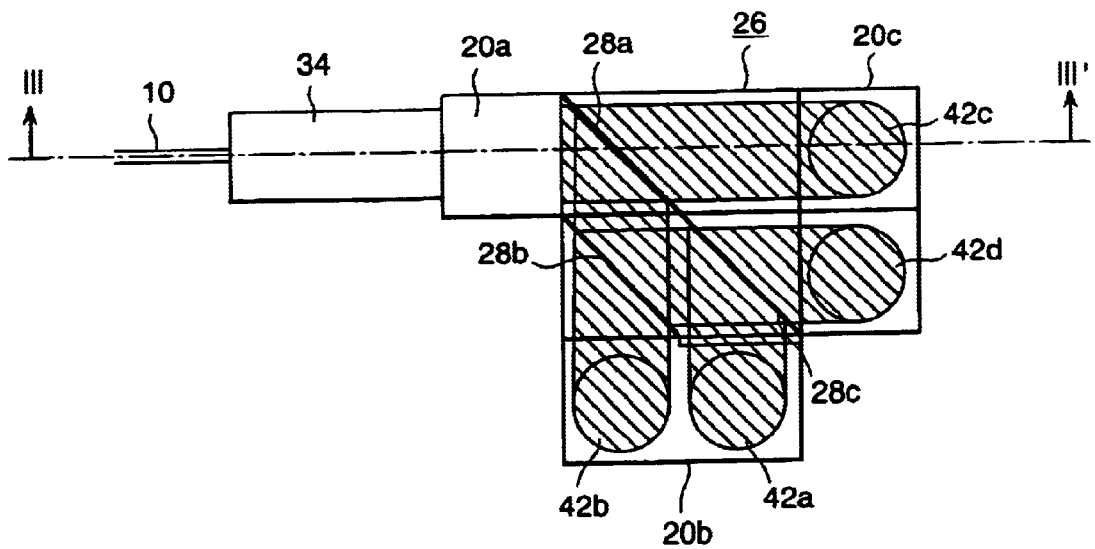
FIG. 2 relates to the first embodiment of the present invention and is a plane view of FIG. 1.

Now, the structure and function of the wavelength separation prism 26 and the polarized light conversion elements 20a, 20b and 20c will be explained with reference to FIG. 2 and FIG. 3. FIG. 2 is a plane view of the wavelength separation optical device according to the present embodiment. The optical signals multiplied with four wavelength components and transmitted via the optical fiber 10 are converted in substantially parallel light beams by the refractive index distribution lens 34, are formed in linear polarized lights by the polarized light conversion element 20a and make incidence into the wavelength separation prism 26. Only one wavelength component of the optical signals made incidence into the wavelength separation prism 26 passes through the waveform separation filter 28a and the remaining three wavelength components are reflected there and are directed to the wavelength separation filter 28b. The optical signal 42c which has passed the wavelength separation filter 28a reaches the polarized light conversion element 20c. Likely, another wavelength component representing another optical signal 42b passes through the wavelength separation filter 28b and the remaining two wavelength components are reflected there and reach the wavelength separation filter 28c through which one of the two remaining wavelength components representing an optical signal 42d passes and the last one wavelength component representing an optical signal 42a is reflected there. In this manner, four wavelength components are separated by making use of the three wavelength separation filters 28a, 28b and 28c. The separated optical signals 42a and 42b make incidence into the polarized light conversion element 20b and the optical signals 42c and 42d make incidence into the polarized light conversion element 20c.

Figure 3:
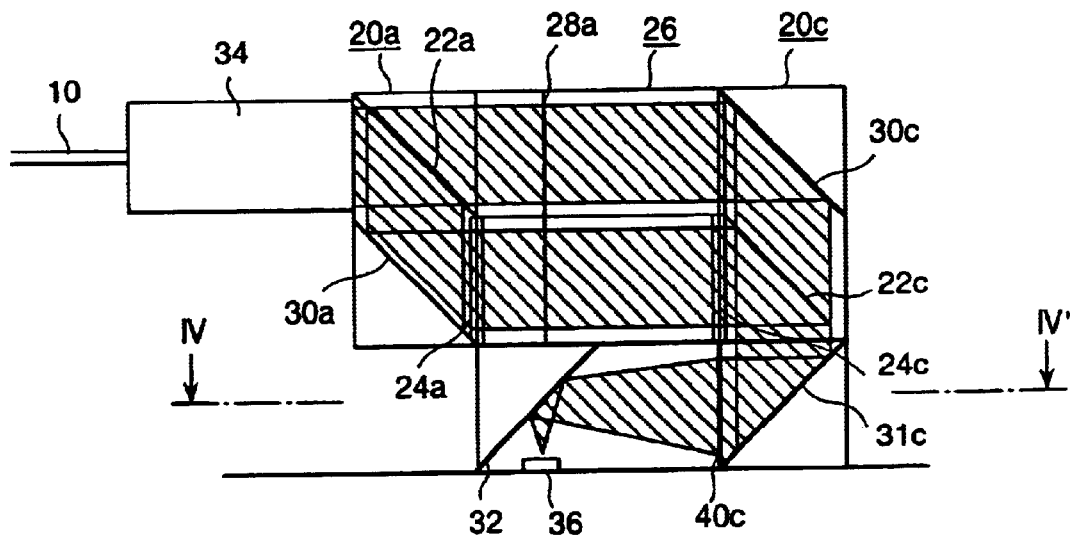
FIG. 3 relates to the first embodiment of the present invention and is a cross sectional view taken along line III–III' in FIG. 2.

FIG. 3 is a cross sectional view taken along line III–III' of the wavelength separation optical device as shown in FIG. 2. The optical signals aligned substantially in parallel light beams by the refractive index distribution lens 34 make incidence into the polarized light conversion element 20a. The polarized light conversion element 20a includes a PBS (Polarized Beam Splitter) 22a, a mirror 30a and a λ/2 plate 24a, and among optical signals made incidence into the polarized light conversion element 20a, P polarized lights pass through the PBS 22a in the polarized light conversion element 20a and S polarized lights are reflected by the PBS 22a. The S polarized lights reflected by the PBS 22a are reflected at the mirror 30a and of which polarized plane are rotated by 90° at the λ/2 plate 24a and are emitted in a form of P polarized light.

Accordingly, the optical signals which pass through the polarized light conversion element 20a and separated into two light beams, are converted into linear polarized light beams of which both polarization planes are aligned in P polarized light beams. The optical signals converted into linear polarized light beams make incidence into the wavelength separation filter 28a, and only one wavelength component thereof passes through the wavelength separation filter 28a. Since the direction of the plane of the wavelength filter 28a is different from the direction of the PBS 22a, polarized lights of the optical signals toward the plane of the wavelength separation filter 28a assume S polarized light beams.

Since the parallel light beams of which polarization direction is aligned make incidence into the wavelength separation filter 28a as has been explained above, a filter with a narrow band which permits a sharp wavelength separation can be used for the wavelength separation filter 28a. The optical signals separated into two light beams at the polarized light conversion element 20a are subjected to wavelength separation at different positions of the wavelength separation filter 28a. The optical signals which have been wavelength separated by the wavelength separation filter 28a and have passed therethrough make incidence into the polarized light conversion element 20c, and one of them is reflected at the mirror 30c and passes through the PBS 22c. With regard to the other optical signal, the polarized light plane thereof is rotated by 90° at the λ/2 plate 24c, reflected at PBS 22c and is merged with the optical signal passed through the PBS 22c.

Accordingly, the separated two optical signals are merged into one optical passage at the PBS 22c. Since the optical passage lengths of the two optical signals are equal, the both can be overlappingly aligned as light beams having substantially the same diameter. Thereafter, the both are reflected at the mirror 31c, converged at the hologram 40c, again reflected at the mirror 32, and then detected by the photo detector array 36. The optical signals reflected at the wavelength separation filter 28a are likely separated successively by other wavelength separation filters and, after their optical passages are merged at the polarized light conversion element, are detected.

Figure 4:
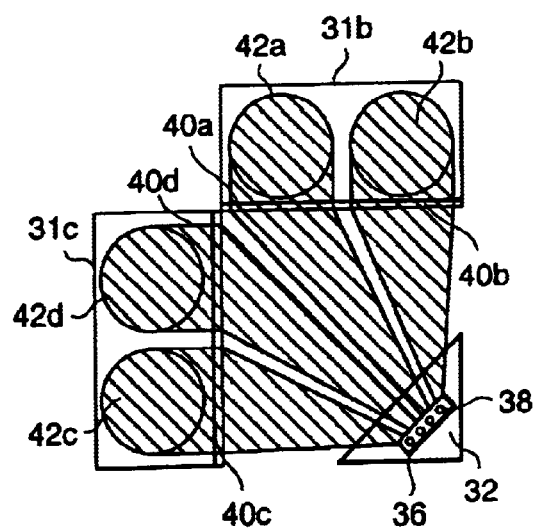
FIG. 4 relates to the first embodiment of the present invention and is a cross sectional view taken along line IV–IV' in FIG. 3.

Now, the photo detection portion will be explained with reference to FIG. 4. FIG. 4 is a cross sectional view showing the photo detection portion in the wavelength separation optical device according to the present embodiment. The optical signals 42a, 42b, 42c and 42d which are separated depending on the wavelength are deflected and converged by respective hologram lenses 40a, 40b, 40c and 40d and are reflected in the mirror 32, and thereafter, are detected by respective photo detectors 38 in the photo detector array 36.

As will be apparent from the above, with the use of the hologram lenses both functions of deflecting and converging the optical signals can be performed. Through the deflection of the optical signals the optical signals can be converged Onto the photo detectors located closely. However, in place of the hologram lenses combination of prisms and lenses can be used. Further, when the photo detectors arc arranged being spaced apart, the light beam convergence can be performed only by lenses.

In the present embodiment, the optical fiber 10 is fixed to the refractive index distribution lens 34, however, the optical fiber 10 can be attached detachably and in such instance a positioning use guide can be provided so that the optical fiber 10 can be attached to a predetermined position after detachment thereof.

Further, in place of the refractive index distribution lens 34, a lens or a concave mirror can be used, and further a lens having a predetermined curvature at one plane can be used by securing the same to the polarized light conversion element 20a. When a lens is used, it is desirable to use a non-spherical lens so as to improve light beam parallel degree and convergence degree. However, through the use of the refractive index distribution lens 34 the optical fiber 10 can be integrated with the wavelength separation optical device, therefore, the position adjustment of the optical fiber 10 is facilitated and an excellent long term characteristic stability can be obtained.

As the base material for the wavelength separation prism, the polarized light conversion element and the mirror, glass and transparent plastic can be used. The optical loss due to light beam propagation through the wavelength separation optical element primarily depends on loss inherent to the base material, however, because of short transmission distance a plastic material having comparatively large absorption coefficient such as polymethylmethacrylate and polycarbonate can be used.

Since the wavelength separation prism, the polarized light conversion element and the mirror can be constituted in a plate shape and the reflection angle of 90° can be used, the configuration of the optical parts can be processed accurately. Further, since the light beams passing through these optical parts are also substantially parallel light beams, adjustment thereof is likely easy.

As generally practiced, the polarized light conversion element is produced by cutting in 45° of bonded plates while forming a PBS therebetween. In the present embodiment, polarized light conversion elements having a same characteristic can be used, and it is sufficient if the plates are cut out while varying their width depending on their use locations and if the position where the λ/2 plate is bonded is varied.

Accordingly, the polarized light conversion element can be produced easily and in great quantity. However, the present invention does not limit the branching angle to 90°, and when the branching angle is not 90°, it is sufficient if the optical members are arranged so as to meet a branching angle other than 90°. Further, without using the polarized light conversion elements after the wavelength separation, the separated two light beams can be respectively received by separate photo detectors.

In the present embodiment, four wavelength components are separated, however, when the number of wavelength separation filters is increased, number of multipled wavelengths can be increased.

Figure 5:
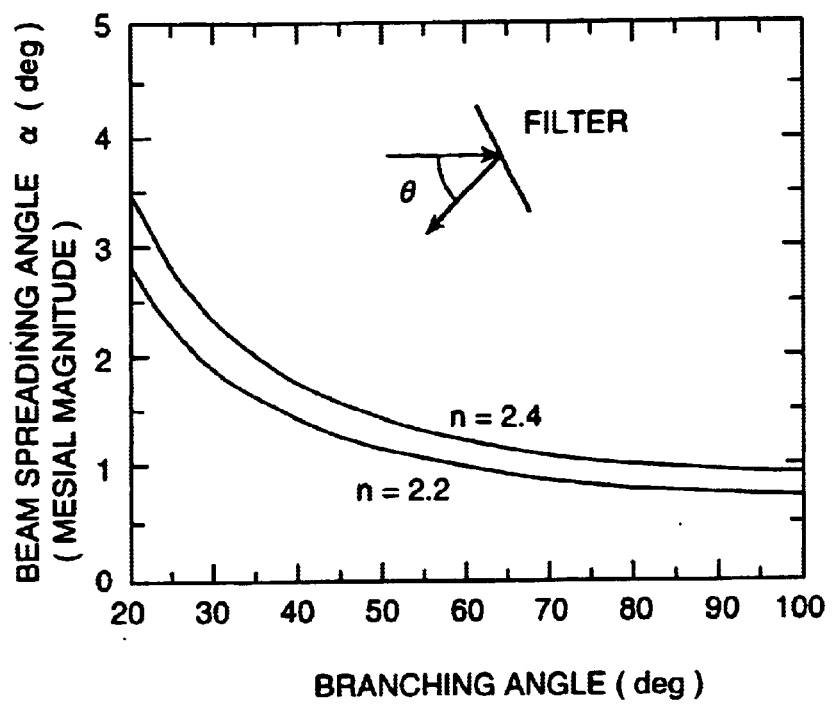
FIG. 5 relates to the first embodiment of the present invention and is a diagram showing a relationship between wavelength separation angle θ of a wavelength separation filter and incident light beam maximum spreading angle which permits separation of wavelength signals.

Now, characteristics of the wavelength separation filter will be explained with reference to FIGS. 5 through 7. FIG. 5 shows a relationship between wavelength separation angle θ of a wavelength separation filter and maximum spreading angle of incident light beam at which wavelength multiplied optical signals can be separated under a condition where an interval between center wavelength is set 24.5 nm near at 1300 nm. The wavelength separation filter is formed by laminating a dielectric film having a high refractive index and another dielectric film having a low refractive index, and it is desirable to use a high refractive index material having refractive index as higher as possible, because tolerance with respect to the spreading angle of the incident light beam can be increased. If a common dielectric film having high refractive index such as $TiO_2$ and ZnS is used, a refractive index of about 2.2~2.4 can be obtained. In the present embodiment in which a branching angle of 90° is used, it is necessary to limit the light beam spreading angle below 1°, when 1° refractive index is 2.4 and the light beam spreading angle below 0.8°, when the refractive index is 2.2. Further, when the branching angle is small, the tolerance with respect to the light beam spreading angle can be increased.

When the branching angle is large as in the present embodiment, characteristic difference is caused depending on polarized light beams. Such characteristic difference due to the polarized light beams is remarkable, when the branching angle is more than 40° (incident angle of more than 20°), in particular, when the branching angle is more than 60° (incident angle of more than 30°).

Accordingly, it is desirable to convert the optical signals making incidence into the polarized light separation filter into linear polarized lights. Through alignment of the polarized planes by making use of the polarized light conversion element as in the present embodiment, the linear polarized light beams can be made incidence in a desired direction of the wavelength separation filter without being suffered from loss of the optical signals.

In the present embodiment, one wavelength component is caused to pass by making use of a bandpass filter for the wavelength separation filter, and when using such bandpass filter, a band narrowing is easily realized by S polarized light in comparison with P polarized light, it is desirable to convert the optical signals into S polarized light beams by the polarized light conversion element as in the present embodiment. When the wavelength separation is performed by using either a lowpass filter or a high pass filter as the wavelength separation filter, such is not required and it is sufficient if the polarized light plane obtained by the polarized light conversion element is selected so that a steep wavelength characteristic can be obtained. When a low pass filter is used, it is preferable to pass and separate the optical signals from the short wavelength side and where a high pass filter is used, it is preferable to pass and separate the optical signals from the long wavelength side.

Now, a specification of a lens necessary for obtaining a desired light beam spreading angle is shown. When a refractive index distribution lens is used as in the present embodiment, if the length 1 of the refractive index distribution lens is determined as ¼ of the periodic length of the refractive index distribution lens, the light beams emitted from the refractive index distribution lens can be aligned substantially in parallel light beams when the optical fiber is disposed so as to contact to the refractive index distribution lens. When assuming that numerical aperture of the optical fibers is as NA, the core diameter thereof as D, the center refractive index of the refractive index distribution lens as $n_c$ and the refractive index of the prism as n, the light beam spreading angle $\psi$ and the emitted light beam diameter d are expressed by the following formulas;

$$\psi \cong \left(\frac{\pi n c}{21} \cdot \frac{D}{2}\right)/n \tag{1}$$

$$d \cong \frac{41}{\pi n c}NA \tag{2}$$

Figure 6:
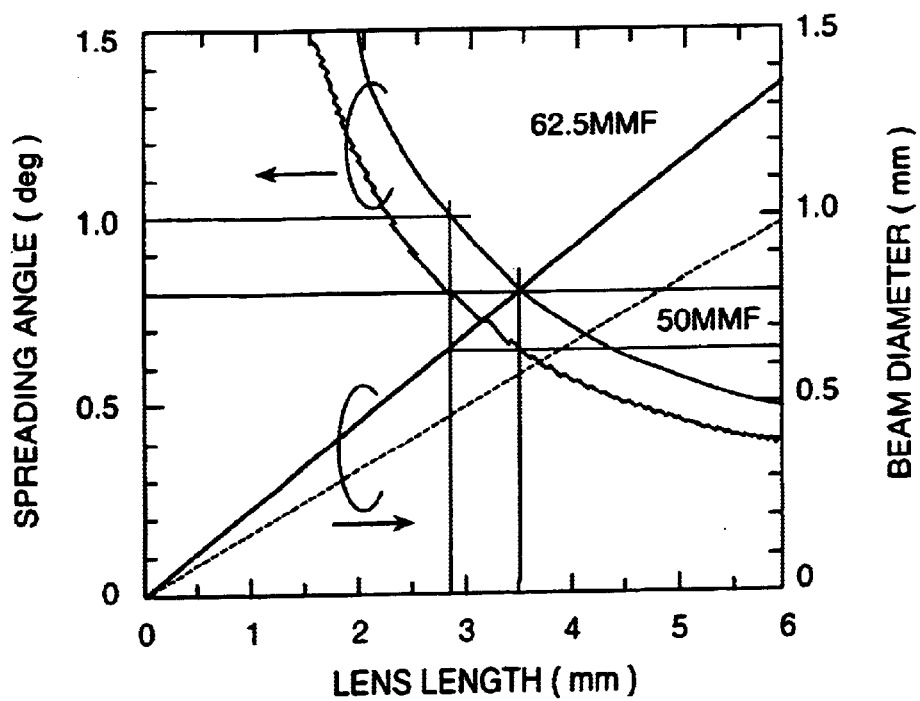
FIG. 6 relates to the first embodiment and is a diagram showing a relationship of light beam spreading angle and light beam diameter with respect to length of a refractive index distribution lens.

FIG. 6 shows a relationship of the light beam spreading angle and the light beam diameter with respect to the lens length of a refractive index distribution lens, and shows the relationships determined when usual multi mode optical fibers of 62.5MMF (core diameter of 62.5 μm and numerical aperture of 0.275) are used. In order to obtain a light beam spreading angle less than 0.8° for the multi mode optical fiber 62.5MMF, it will be sufficient if the lens length of more than 2.8 mm is selected, and in order to obtain a light beam spreading angle less than 1° for the multi mode optical fiber 62.5MMF, it will be sufficient if the lens length of more than 3.5 mm is selected. In such instances the respective light beam diameters give more than 0.62 mm and more than 0.8 mm.

Likely, the light beam spreading angle $\psi$ and the emitted light beam diameter d with respect to lens focal distance f when a single lens is used are expressed by the following formulas;

$$\psi \cong \left(\frac{D}{2f}\right)/n \tag{3}$$

$$d = 2f\tan\theta + D \tag{4}$$

Figure 7:
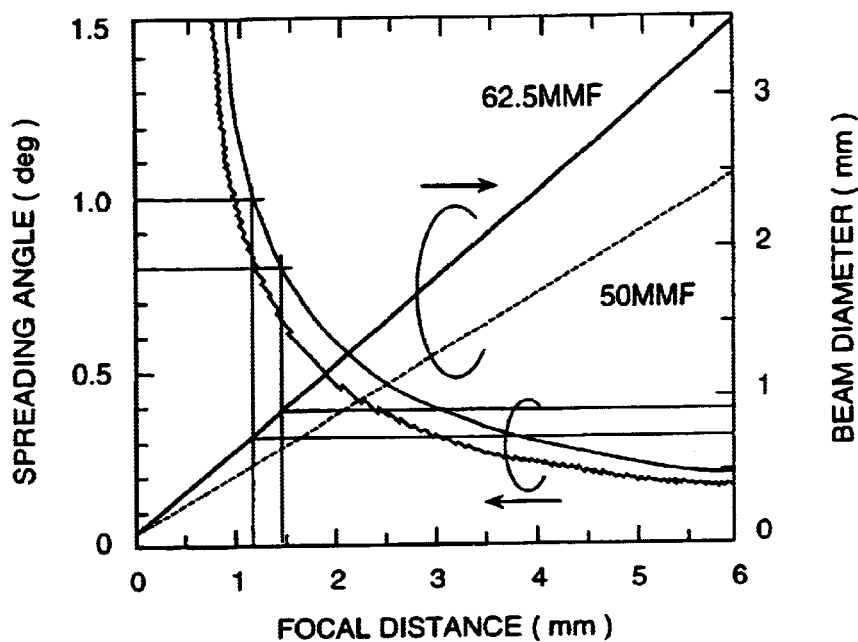
FIG. 7 relates to the first embodiment of the present invention and is a diagram showing a relationship between focal distance of a single lens, light spreading angle and light beam diameter.

FIG. 7 shows a relationship between focal distance, light beam spreading angle and light beam diameter. In order to obtain the light beam spreading angle of less than 1° for the multi mode optical fiber 62.5 MMF, it is sufficient if the focal distance of more than 1.2 mm is selected, and in order to obtain the light beam spreading angle of less than 0.8° for the multi mode optical fiber 62.5 MMF, it is sufficient if the focal distance of more than 1.5 mm is selected. In such instances, the respective light beam diameters give more than 0.75 mm and more than 0.9 mm.

As will be apparent from the above, when the lens length of the refractive index distribution lens or the focal distance of the lens is elongated, the light beam parallel degree can be improved, however, the emitted light beam diameter thereof increases and the size of the wavelength separation optical device enlarges. When aligning the optical signals in parallel by making use of the refractive index distribution lens as in the present embodiment, the light beam spreading angle from the optical fiber decreases by the amount corresponding to the refractive index of the refractive index distribution lens in comparison with under atmospheric air. Namely, most of refractive indexes of plastic and glass are about 1.5, therefore, the light beam spreading angle is also small as about 67%. Accordingly, the use of the refractive index distribution lens effects to lower the light beam spreading angle to thereby decrease the emitted light beam diameter which contributes to reduce the size of the wavelength separation prism.

Further, since the light beam spreading angle $\psi$ can be determined in the same definition as the number of openings of the optical fibers, the angle which assumes 1/10 of the peak intensity is acceptable.

A second embodiment of the present invention will be explained with reference to FIGS. 8 and 9.

Figure 8:
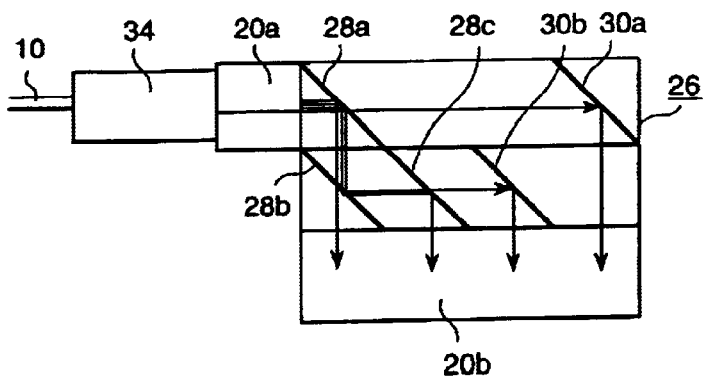
FIG. 8 relates to a second embodiment of the present invention and is a plane view showing a wavelength separation optical device.

FIG. 8 is a plane view showing a wavelength separation optical device according to the present embodiment. The wavelength multiplied optical signals transmitted through the optical fiber 10 make incidence into the refractive index distribution lens 34 and are converted there into substantially parallel light beams. The optical signals converted into substantially parallel beams in the refractive index distribution lens 34 make incidence into the polarized light conversion element 20a, and are separated into two light beams and are emitted in a form of two linear polarized light beams of which polarization direction is aligned.

The linear polarized light beams from the polarized light conversion element 20a make incidence into the wavelength separation prism 26 and are separated by the wavelength separation filters 28a, 28b and 28c. In the present embodiment, the optical signals are separated into four wavelength components. The optical signal passed through the wavelength separation filter 28a is reflected at the mirror 30a, and further the optical signal passed through the wavelength separation filter 28c is reflected at the mirror 30b, and is emitted together with the optical signals of other wavelength components while aligning the direction thereof. The optical signals of four wavelength components separated by the wavelength separation prism 26 are merged at the polarized light conversion element 20b into one light beam passage from the separated two light beam passages.

Figure 9:
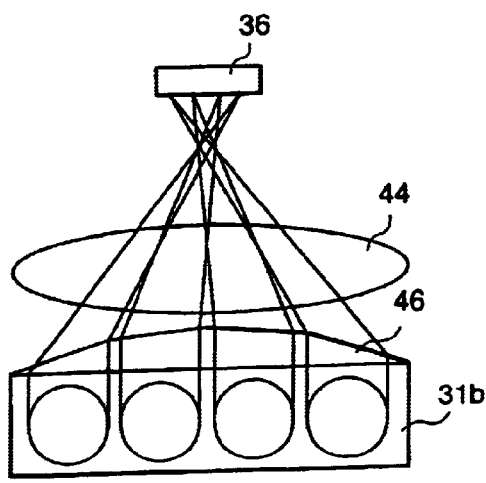
FIG. 9 relates to the second embodiment of the present invention and is a plane view showing a photo detector portion in the wavelength separation optical device.

FIG. 9 is a plane view showing a photo detector portion in the wavelength separation optical device according to the present embodiment. The four optical signals reflected at the mirror 31b are refracted and deflected by the deflection use prism 46 having slops corresponding to the respective optical signals. The deflected optical signals are converged by lens 44 toward respectively different photo detectors in the photo detector array 46 to detect the same. Thus, the optical signals having four wavelength components are converged by the lens and are detected by the photo detector array 46.

In the present embodiment, since the optical signals having four wavelength components are emitted while aligning their direction by making use of the mirror, their coupling with the photo detectors is facilitated. Further, the provision of only one polarized light conversion element is satisfactory after passing through the wavelength separation filters.

A third embodiment of the present invention will be explained with reference to FIG. 10.

Figure 10:
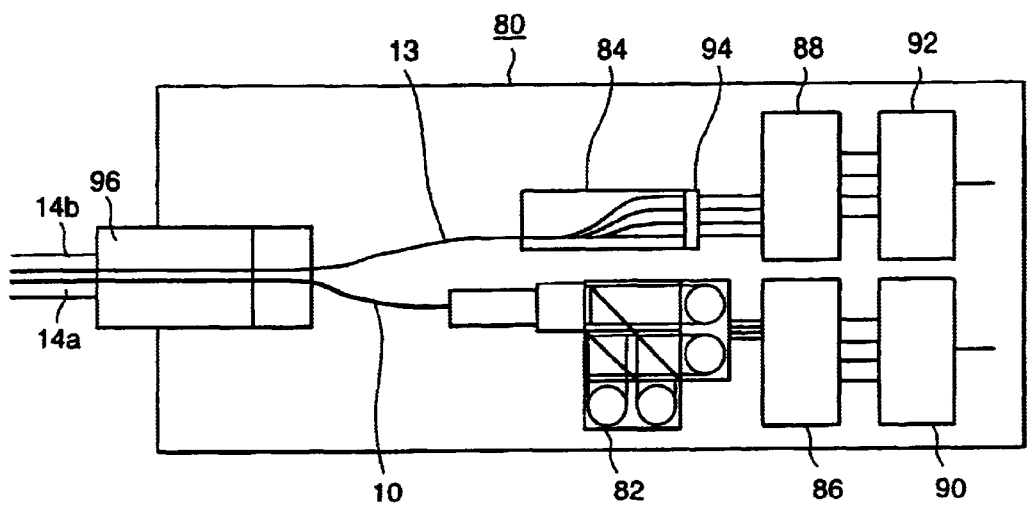
FIG. 10 relates to a third embodiment of the present invention and is a constructional and structural diagram showing a light transmission module.

FIG. 10 is a constitutional diagram showing an optical transmission module according to the present embodiment. Transmission optical fibers 14a and 14b are connected to an optical transmission module 80 via a connector 96, and are respectively abutted to the signal receiving use optical fiber and a signal sending use single mode optical fiber 13. The wavelength multiplied signals transmitted via the transmission use optical fiber 14a for signal receiving use make incidence into the multi mode optical fiber 10 abutted to the transmission use optical fiber 14a, are separated for every wavelength component at a wavelength separation device 82 according to the present invention, and are detected by the photo detector array.

The detected signals are amplified and wave-shaped by a signal receiving circuit 86, are converted from the transmitted multiplied signals to serial signals and are outputted. When sending signals the inputted signals are separated by a serial parallel conversion circuit 92 and by making use of a signal sending circuit 88 respective light sources in the laser diode array 94 are driven by every signal component to form optical signals having different wavelengths. The respective optical signals for sending are multiplied by a wavelength component merging device 84 constituted by a single mode photo coupler and are outputted to the single mode optical fiber 13. The signals are coupled via the single mode optical fiber 13 to the transmission use optical fiber 14b for sending signals and are sent out. Since the transmission use optical fibers 14a and 14b are coupled by making use of the single mode optical fiber 13 and the multi mode optical fiber 10, either a multi mode optical fiber or a single mode optical fiber can be used for the transmission use optical fibers 14a and 14b. Accordingly, it is possible to exchange between a multi mode optical fiber and a single mode optical fiber at the photo connector 96.

The first embodiment is constituted so as to separate four wavelength components having center wavelength 1275.7 nm, 1300.2 nm, 1324.7 nm and 1349.2 nm from the transmitted multiplied optical signals. These center wavelengths are assumed to fluctuate at maximum ±5.7 nm depending on wavelength variation due to optical source products, temperature and spectrum distribution.

Accordingly, wavelength space between the adjacent channels is set at 13.1 nm which corresponds to about 1% of wavelength to be transmitted. These wavelengths fall in a region where possible loss in quartz core is small which is used for the transmission use optical fiber and are in a range where light transmission can be performed with a lower loss. The wavelength variation is determined depending on the preparation and characteristic of the optical source and has to be permitted so as to avoid particularly strict selection thereof. Further, since the space between the adjacent wavelength bands is determined 1% of the center wavelength 1312.5 nm in view of wavelength separation characteristic of the wavelength separation optical device, it is necessary to determine the interval between the center wavelengths as 24.5 nm as above. As the optical fiber 10, a grated index type multi mode optical fiber having core diameter 62.5 $\mu$m and number of openings 0.275 was used. The optical fiber 10 is bounded and secured to the refractive index distribution lens 34.

As the refractive index distribution lens 34 one having lens length of 3.2 mm, core diameter of 1 mm and numerical aperture of 0.37 was used. With this refractive index distribution lens 34 the light beam spreading angle making incidence into the polarized light conversion element can be controlled at 0.9°, even if the spreading angle of the light beam spreads under steady state of the optical fiber 10. With the refractive index distribution lens the light beam diameter is restricted to 0.75 mm and is causes to make incidence into the polarized light conversion element.

Figure 11:
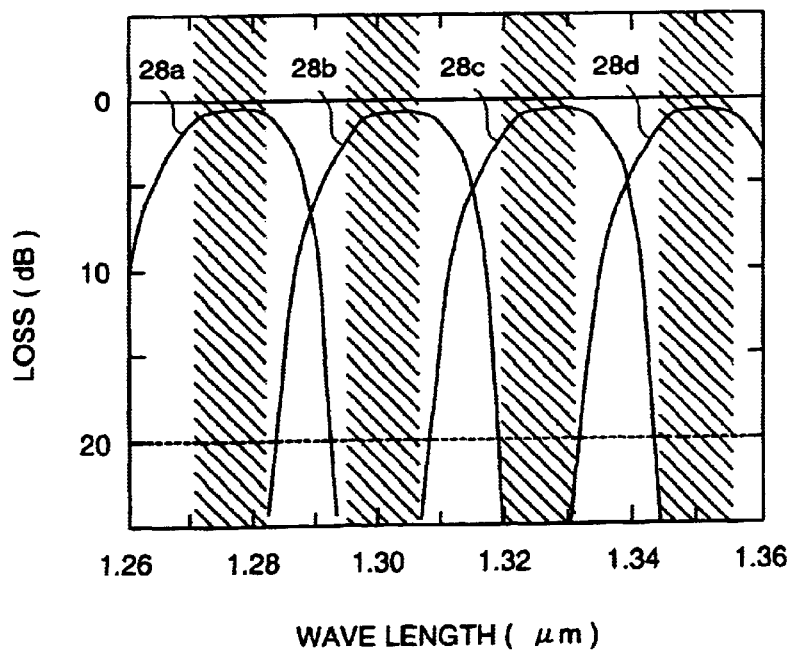
FIG. 11 relates to the first embodiment of the present invention and is a diagram showing a characteristic of a wavelength separation filter.

Accordingly, one of the four sides of the wavelength separation prism is determined as 2 mm and the total size of the wavelength separation optical device is determined as 7.2×3×3 mm$^3$. FIG. 11 shows a characteristic of the wavelength separation filter used in the present embodiment. The wavelength separation filter can be constituted by a generally known interference filter and separates respective wavelength components with loss of below 2 dB and cross talk of below −20 dB.

For the optical transmission module of the third embodiment, the wavelength separation optical device of the first embodiment was used. For the optical fiber 10 a grated index type multi mode fiber having core diameter of 62.5 $\mu$m was used. For the transmission use optical fibers 14a and 14b a single mode optical fiber and a multi mode optical fiber having core diameter 50 $\mu$m or 62.5 $\mu$m can be used. A MTRJ connector was used for the connector 20. For this reason, in order to arrange in parallel with the wavelength component merging device 84, the wavelength separation optical device 82 has to be reduced less than 6.5 mm, of which requirement was fully satisfied. In the present embodiment, as the photo detector array 60 a photo detector having photo receiving portion size of 80 µm is used, thereby, an optical signal is sent out at velocity of 2.5 Gbps for one wavelength component, thereby, the transmission velocity of four wavelength components is 10 Gbps.

As has been explained hitherto, with the wavelength separation optical device according to the present invention which includes an optical signal beam spreading angle reducing means and polarized light conversion means and separates wavelength components after making incidence of linear polarized light beams into wavelength separation filters, a wavelength separation optical device with a low optical loss which is assembled and adjusted easily can be provided.

What is claimed is:

1. A wavelength separation optical device comprising:

a photo transfer medium which carries and transfers multiplied optical wavelength components;

a wavelength separation means which separates optical signals having multiple wavelength components carried through the photo transfer medium for every wavelength;

a plurality of photo detectors which receive the optical signals separated by the wavelength separation means;

a spreading angle reducing means which reduces a spreading angle of the optical signals making incidence from the photo transfer medium; and a front polarized light conversion means which converts the optical signals transmitted from the spreading angle reducing means to the wavelength separation means into linear polarized light; and a rear polarized light conversion means which passes the optical signals separated by the wavelength separation means before being received by the photo detectors, and wherein the wavelength separation means is a wavelength separation prism including a plurality of wavelength separation filters, and the optical signals separated by the front polarized light conversion means into two optical passages are merged into one optical passage by the rear polarized light conversion means; and either the front polarized light conversion means or the rear polarized light conversion means is constituted by a polarized light beam splitter and a $\lambda/2$ plate.

2. A wavelength separation optical device of claim 1, wherein an incident angle of the optical signals making incidence into the wavelength separation means is not less than 20°.

3. A wavelength separation optical device of claim 1, wherein the spreading angle reducing means is a refraction index distribution lens.

4. A wavelength separation optical device of claim 1, wherein a plurality of optical signals separated by the wavelength separation means are emitted in a same direction.

* * * * *